(No Model.)

W. M. MARSHALL.
ERASER HOLDER.

No. 501,893. Patented July 18, 1893.

WITNESSES:
C. H. Nagle.
L. Douville.

INVENTOR
Wm. M. Marshall

UNITED STATES PATENT OFFICE.

WILLIAM M. MARSHALL, OF PHILADELPHIA, PENNSYLVANIA, ASSIGNOR OF THREE-FOURTHS TO SAMUEL REITER, TRUSTEE, OF SAME PLACE, AND JOSIAH TORR, OF ATLANTIC CITY, NEW JERSEY.

ERASER-HOLDER.

SPECIFICATION forming part of Letters Patent No. 501,893, dated July 18, 1893.

Application filed December 20, 1892. Serial No. 455,801. (No model.)

*To all whom it may concern:*

Be it known that I, WILLIAM M. MARSHALL, a citizen of the United States, residing in the city and county of Philadelphia, State of Pennsylvania, have invented a new and useful Improvement in Eraser-Holders, and in cleaning them after use in removing pencil-marks, which improvement is fully set forth in the following specification and accompanying drawings, in which—

Figure 1:
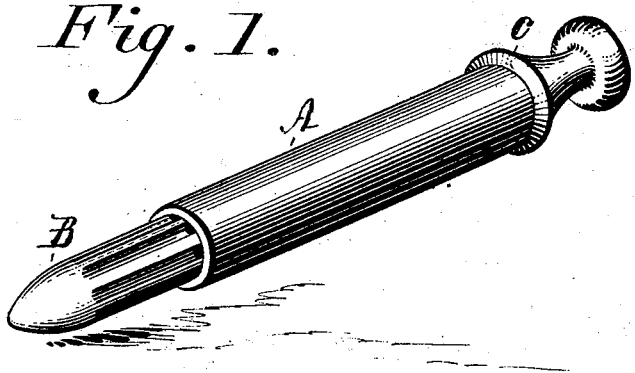
Figure 2:
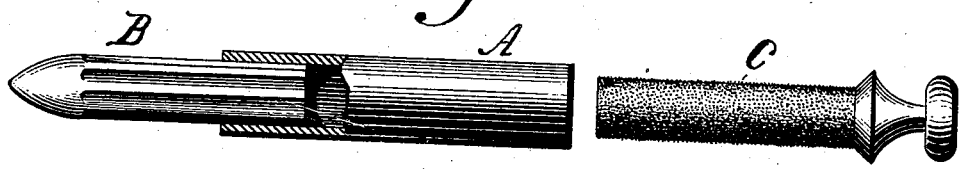
Figure 3:
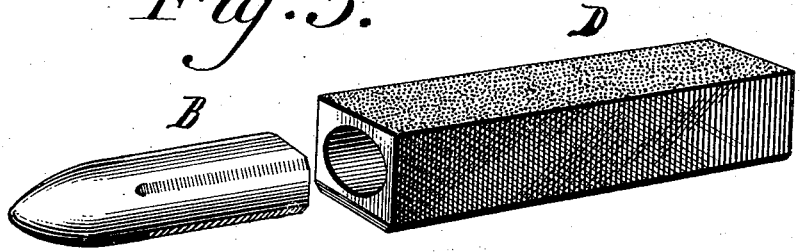
Figure 4:
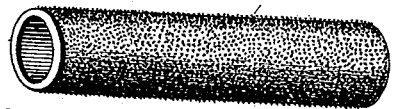

Figure 1 represents a fluted india rubber eraser inserted in one end, of a covering for the same, and the cleaner in the other end. Fig. 2 represents the fluted rubber eraser, exposed, in the covering, and the cleaner, showing its construction. Fig. 3 represents a modification, the eraser being substantially square in form, with round corners, and the case or cover being square and having two of its sides covered with sand or emery, forming a cleaner, another side having a honing composition thereon, and the remaining side being of leather. Fig. 4 represents another modification of the cover, the same having its entire surface covered with the cleaning material.

My invention relates to improvements in india rubber erasers, in cleaners, and coverings, or holders for the same.

Referring to the drawings, A represents a hollow tube, made of paper, papier maché, wood, or metal.

B, represents the eraser, with flutes, or indentations to hold it firmly to inside of case, so that it can be drawn out or pressed in at pleasure, and used up, to a small end.

C represents the cleaner, being a cylindrical surface of wood or other material being slightly beveled at one end to partially enter the hollow tube to bind and hold it in place, and terminating in a bevel in the opposite direction, with a knob as a handle, and the surface being covered with sand or emery.

D represents a square covering with sand or emery on two sides, an artificial hone, and leather on the remaining sides.

E represents a covering or holder, with sand or emery covering the whole outside surface.

As will be seen, the cleaner C is readily accessible when it is needed to clean the eraser, which operation is performed by either rubbing the rough surface of the cleaner on the eraser or by rubbing the eraser on the cleaner, as may be most convenient.

I am aware that hollow cylinders have been used to hold india rubber erasers and I do not claim that broadly, but Having described my invention, what I claim as new, and desire to secure by Letters Patent, is—

1. A holder provided with a rubber eraser and a cleaner for said eraser, substantially as described.

2. A holder having a cover, a rubber eraser held in one end thereof, and a removable cleaner inserted in the opposite end, said parts being combined substantially as described.

3. A holder having a cover, a rubber eraser and a cleaner having a beveled head with a handle, said parts being combined substantially as described.

WILLIAM M. MARSHALL.

Witnesses:
JOHN A. WIEDERSHEIM,
R. H. GRAESER.